(12) United States Patent
Nakamura et al.

(10) Patent No.: US 6,763,934 B2
(45) Date of Patent: Jul. 20, 2004

(54) ELECTROMAGNETICALLY DRIVEN TRANSPORT DEVICE AND WEIGHING APPARATUS USING THE SAME

(75) Inventors: Yoshihiro Nakamura, Ritto (JP); Hiroaki Morinaka, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/057,885

(22) Filed: Jan. 29, 2002

(65) Prior Publication Data

US 2002/0066645 A1 Jun. 6, 2002

(30) Foreign Application Priority Data

Aug. 31, 2000 (JP) ..................................... 2001-263629

(51) Int. Cl.[7] ............................................. B65G 27/32
(52) U.S. Cl. ....................................................... 198/769
(58) Field of Search ........................................ 198/769

(56) References Cited

U.S. PATENT DOCUMENTS

| 3,864,618 | A |   | 2/1975  | Hammond              |         |
|-----------|---|---|---------|----------------------|---------|
| 5,291,398 | A |   | 3/1994  | Hagan                | 364/408 |
| 5,472,079 | A | * | 12/1995 | Yagi et al.          | 198/762 |
| 5,532,928 | A |   | 7/1996  | Stanczyk et al.      |         |
| 5,631,828 | A |   | 5/1997  | Hagan                | 395/204 |
| 5,664,112 | A |   | 9/1997  | Sturgeon et al.      |         |
| 5,726,884 | A |   | 3/1998  | Sturgeon et al.      |         |
| 5,765,140 | A |   | 6/1998  | Knudson et al.       |         |
| 5,793,636 | A |   | 8/1998  | Cooney et al.        |         |
| 5,808,916 | A |   | 9/1998  | Orr et al.           |         |
| 5,864,685 | A |   | 1/1999  | Hagan                | 395/235 |
| 5,890,129 | A |   | 3/1999  | Spurgeon             |         |
| 6,067,549 | A |   | 5/2000  | Smalley et al.       | 707/104 |
| 6,085,976 | A |   | 7/2000  | Sehr                 | 235/384 |
| 6,088,700 | A |   | 7/2000  | Larsen et al.        | 707/10  |
| 6,091,835 | A |   | 7/2000  | Smithies et al.      | 382/115 |
| 6,122,635 | A |   | 9/2000  | Burakoff et al.      | 707/102 |
| 6,168,010 | B1| * | 1/2001  | Komatsu              | 198/751 |
| 6,256,640 | B1|   | 7/2001  | Smalley et al.       | 707/104 |
| 6,260,044 | B1|   | 7/2001  | Nagral et al.        | 707/102 |

FOREIGN PATENT DOCUMENTS

| EP | 0453241 A1 | * | 10/1991 | ........... B65G/27/32 |
| EP | 0 781 718 A2 |   | 7/1997 |                        |
| JP | 03-223014 |   | 10/1991 |                        |
| JP | 07-060188 |   | 3/1995 |                        |

OTHER PUBLICATIONS

"A Broker for Tracking, Delivering and Using Regulations Over the World Wide Web," Stasiak et al., Proceedings of the 1996 IEEE International Symposium on Electronics and the Environment, May 6–8, 1996, pp. 293–297.

Ending the Method 21 Paper Chase. Environmental Solutions, p. 30, Jun. 1996.

Pen PC's Power Gas Company, John Longwell, Computer Reseller News, No. 628, pp. S15–S161. May 1995.

(List continued on next page.)

*Primary Examiner*—Christopher P. Ellis
*Assistant Examiner*—Mark A. Deuble
(74) *Attorney, Agent, or Firm*—Staas & Halsey LLP

(57) ABSTRACT

An electromagnetically driven transport device 1 includes a transport unit 4 for transporting an article M to be transported, an electromagnetically driven vibrating unit 2 for vibrating the transport unit 1 to transport the article, a frequency controlling unit 14, a time detecting unit 15 and a frequency setting unit 16. The frequency controlling unit 14 controls a driving frequency of a driving power source 13 of the vibrating unit 2. The time detecting unit 15 detects a time length T during which when the driving frequency is changed the driving current of the vibrating unit at each of frequency exceeds a reference current value. The frequency setting unit 16 is operable to set an actual driving frequency based on the time length T detected by the time detecting unit 15.

11 Claims, 9 Drawing Sheets

OTHER PUBLICATIONS

Health and Safety Inspect Software Developed for Badger Ruggedized Handheld Computers. News Release, Mar. 14, 1994.

Improve Portable Monitor Selection. S Hennigan et al., Hydrocarbon Processing, vol. 74, N. 2, pp. 76(8) Feb. 1995.

The Age of Aquarius: Wetlands Take Center Stage. Beth Wade, American City & Country, vol. 109, No. 12, pp. 50(8), Nov. 1994.

"Grant Application & Management System–Version 6.01.95", North Carolina State University, pp. 12–29, Jun. 1995.

PDSI to Offer Maximo® Wireless in Jun. 1999. PR Newswire Boston, Mar. 15, 1999.

Wireless IP–A Case Study. Peter Rysavy, Rysavy Research for PCS Data Today online journal, Apr. 30, 1999.

Touring NPEM 1999: Information Technologies for Maintenance Management Show Promise, Innovation. Tom Singer, Tompkins Associates, Inc., Plant Engineering Magazine, May. 1, 1999.

PenningVertical Software. VARBusiness, Jun. 1994 pp. 173 by Katherine Bull.

Badger sets sights on VARs to sell "rugged" computers. Computer Reseller News, Oct. 25, 1993, p. 124 by Eric Hausman.

SPARS— State Permitting and Air Reporting System, "How Will Electronic Permitting Help Industry, Citizens and the DNR?" http://www.dnraq.state.ia.us/spars pages/help.htm.

SPARS— State Permitting and Air Reporting System, "SPARS Frequently asked Questions (FAQ)", http://www.dnraq.state.ia.us/spars pages/faq.htm.

SPARS— State Permitting and Air Reporting System, SQL Anywhere User's Guide, Version 2.07 by Windsor Technologies, Inc. for the Iowa Department of Natural Resources.

Georgia Tech Video: Integrated Optic Sensor May Soon Revolutionize Chemical Testing. Optical Materials & Engineering News, vol. 4, No. 2, Oct. 1993.

Information Technology Seen Key to Cutting New Nuclear Plant Costs, Nucleonics Week, vol. 41, No. 16, p. 2, Apr. 20, 2000.

Portable Maintenance, Dilger, Karen Abramic, Manufacturing Systems, vol. 15, No. 12, pp. 20–22, Dec. 1997.

Pen PC's Power Gas Company, John Longwell, Computer Reseller News, No. 628, pp. S15–S161. May 1995.

Computerized Applications in Composting and Recycling. David Riggle, Biocycle, vol. 43, No. 3, pp. 60–63, Mar. 1993.

U.S. patent application Ser. No. 09/528,718, Smalley et al., filed Mar. 20, 2000.

U.S. patent application Ser. No. 09/654,515, Singer et al., filed Sep. 1, 2000.

* cited by examiner

ELECTROMAGNETICALLY DRIVEN TRANSPORT DEVICE AND WEIGHING APPARATUS USING THE SAME

BACKGROUND OF THE INVENTION

1. Field of the Invention

The present invention relates to an electromagnetically driven transport device for electromagnetically vibrating a transport unit to transport an article to be transported, and a weighing apparatus utilizing such transport device.

2. Description of the Prior Art

The transport device of the kind referred to above is so designed and so configured that the transport unit such as, for example, a trough for the support thereon of articles to be transported is mounted on a support base through a bracket that can be vibrated forwards and rearwards by an electromagnet to thereby transport the articles successively. In such case, in order to achieve an efficient transport of the articles, the driving frequency of an electric power source for driving the electromagnet is chosen to be equal to the natural frequency of the transport device.

Methods hitherto known to coordinate the driving frequency with the natural frequency of the transport device includes the use of an inverter for variably setting the driving frequency so that the driving frequency at which the electric power supplied can be maximized is used to actually drive the electromagnet to achieve the transport such as disclosed in, for example, the Japanese Patent No. 2,770,295 (JPA3-223014); and the use of an inverter for variably setting the driving frequency so that the driving frequency at which the current can be maximized can be determined automatically at which the transport device is driven to achieve the transport of the articles such as disclosed in, for example, the Japanese Laid-open Patent Publication No. 7-060188.

It has, however, been found that with the transport device that is driven to effect the actual transport at the driving frequency at which the electric power supplied can be maximized, a detecting circuit for detecting a voltage and a current is needed for calculation of the electric power and the transport device is accordingly complicated in structure. On the other hand, with the transport device that is driven at the driving frequency that is automatically determined at which the electric current can be maximized requires the use of a calculating unit and a storage unit of a correspondingly large capacity for detecting the electric current at all times and then to calculate the maximum value of the electric current and the transport device is therefore complicated in structure and high in cost.

SUMMARY OF THE INVENTION

The present invention has therefore been devised to substantially eliminate the above discussed problems and inconveniences and is intended to provide a simple and low-cost, electromagnetically driven transport device capable of achieving an efficient transport and, also, a weighing apparatus utilizing at least one such electromagnetically driven transport device.

In order to accomplish the foregoing object, the present invention provides an electromagnetically driven transport device which includes a transport unit for transporting an article to be transported; an electromagnetically driven vibrating unit for vibrating the transport unit to transport the article; a control unit for controlling a driving frequency of a driving power source of the vibrating unit; a time detecting unit for detecting a time length during which when the driving frequency is changed the driving current of the vibrating unit at each of frequency exceeds a reference current value; and a frequency setting unit for setting an actual driving frequency based on the time length detected by the time detecting unit.

According to the present invention, when the driving frequency of the driving power source of the vibrating unit is varied by the control unit, the time detecting unit detects the time length during which the driving current of the vibrating unit at each of the frequencies exceeds the reference current value and the frequency setting unit sets the actual driving frequency based on the time length so detected. Accordingly, with no need to use any detecting circuit for detecting a voltage or a current, any calculating unit and any storage unit of a large capacity, the transport unit can be vibrated at the driving frequency close to the natural frequency of the transport device and, therefore, it is possible to achieve an efficient transport drive with a simplified and low-cost structure.

In a preferred embodiment of the present invention, the time detecting unit may include an element that is activated when the driving current exceeds the reference current value, and is operable to detect the time length depending on an operating condition of such element. Alternatively, the time detecting unit may include a voltage comparator for comparing a voltage corresponding to the driving current with a voltage corresponding to the reference current value for outputting an output signal, so that the time length can be detected in dependence on a condition of the output signal from the voltage comparator. With this configuration, the time detecting unit can have a simple and low-cost structure to achieve an efficient transport drive.

In a preferred embodiment of the present invention, the electromagnetically driven transport device may further include a memory for storing a reference current value and a detecting means for detecting a current value of the driving current, and the time detecting unit is operable to detect the time length based on the detected current value and the reference current value.

According to this configuration, since the reference current value appropriate to a particular kind of the article to be transported and/or a particular type of the transport unit can be read out from the storage unit and be then used, it is possible to achieve an efficient transport drive appropriate to various modes of operation of the transport device.

In a preferred embodiment of the present invention, the frequency setting unit may set the actual driving frequency based on change of the time length. Accordingly, even though the time length represents various values, the actual driving frequency appropriate to such change of the time length can be set.

In a still further preferred embodiment of the present invention, detection performed by the time detecting unit is carried out during a trial run of the transport device and drive of the transport device at the actual driving frequency so set is carried out during an actual run of the transport device. In such case, from the very beginning of the actual run, the transport of the articles can be efficiently performed with the transport device driven at the proper actual driving frequency.

The present invention also provides a weighing apparatus which includes a plurality of electromagnetically driven transport devices each being of the structure as discussed above and a weighing unit for weighing an article transported by each of the electromagnetically driven transport device. In this weighing apparatus, the actual driving frequency for each of the electromagnetically driven transport devices is preferably individually set by the frequency setting unit.

With this weighing apparatus, since for each of the transport devices employed therein the transport unit can be vibrated at the actual driving frequency about equal to the natural frequency of the transport device, it is possible to achieve an efficient transport drive.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DETAILED DESCRIPTION OF THE EMBODIMENTS

Figure 1:
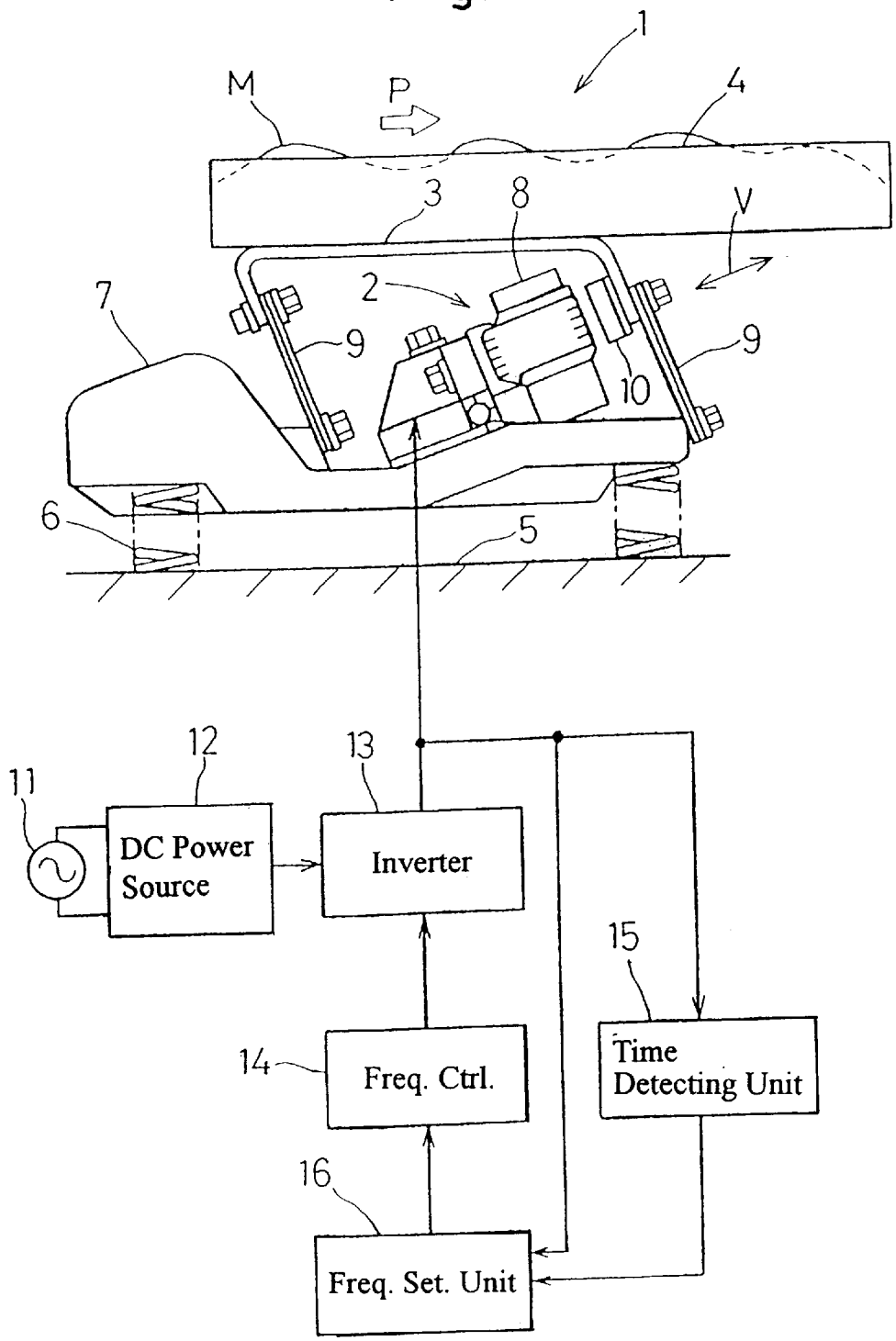
FIG. 1 is a schematic side view showing an electromagnetically driven transport device according to a first preferred embodiment of the present invention shown together with a circuit block diagram therefore.

Referring to FIG. 1, there is schematically shown an electromagnetically driven transport device 1 according to a first preferred embodiment of the present invention. The transport device 1 shown therein includes a vibrating unit 2 and a trough (a transport unit) 4 mounted on the vibrating unit 2 through a bracket 3. The vibrating unit 2 in turn includes a base 7 mounted on a machine framework 5 serving as a transport unit on which the transport device 1 is installed through a plurality of vibration isolating elastic elements 6, an electromagnet 8 mounted on the base 7, front and rear leaf springs 9 extending parallel to each other and each secured at one end to a front or rear arm of the bracket 3 by means of a bolt B 1 and nut and at the opposite end to a front or rear portion of the base 7 by means of a bolt and nut, respectively, and a movable iron core 10 fixedly carried by the bracket 3 at a location adjacent an upper end portion of the rear leaf spring 9 so as to confront the electromagnet 8.

The electromagnet 8 is adapted to be electrically powered by an inverter 13 serving as a source of an electric driving power.

When the electromagnet 8 is electrically powered by the inverter 13, the bracket 3 can be vibrated through the leaf springs 9 in a vibrating direction that is oriented horizontally and slightly upwardly as shown by the arrow V relative to the horizontally lying trough 4, so that articles M placed on the trough 4 can be fed in a transport direction shown by the arrow P.

The inverter 13 is fed an electric drive power from a direct current power source 12 operable to convert a commercial alternating current from a commercial AC power outlet 11 into a direct current, and the frequency of the electric drive power is controlled by a frequency controlling unit 14. The magnitude of the driving current supplied from the inverter 13 to the electromagnet 8 of the vibrating unit 2 is detected by a time detecting unit 15. In other words, the time detecting unit 15 detects an equivalent of the magnitude of the driving current in terms of a time length during which the driving current supplied from the inverter 13 to the electromagnet 8 during a trial run of the apparatus prior to the actual operation of such apparatus exceeds a predetermined reference current value.

Figure 3:
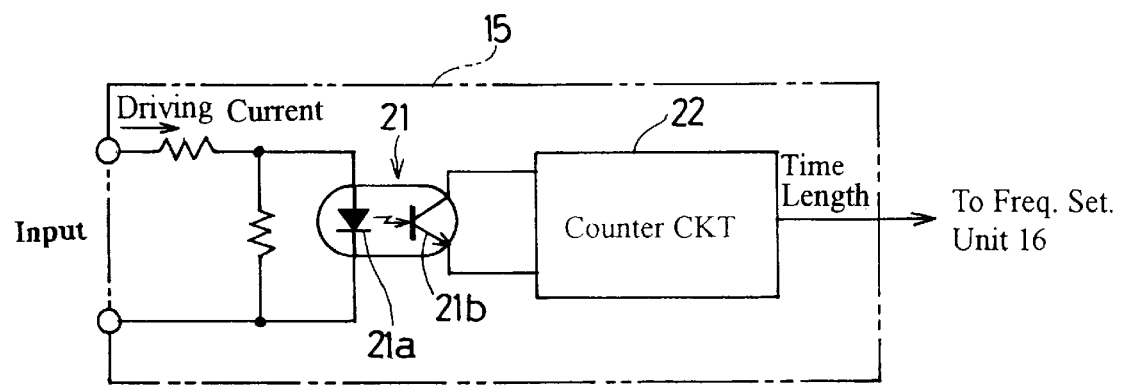
FIG. 3 is a circuit diagram showing a time detecting unit employed in the electromagnetically driven transport device.

FIG. 3 illustrates an example of the time detecting unit 15. This time detecting unit 15 includes an element such as, for example, a photo coupler 21 adapted to be activated when the driving current applied to the vibrating unit 2 exceeds the reference current value, and a counter circuit 22 for detecting the time length in dependence on the activation of the photo coupler 21. The photo coupler 21 is made up of a light emitting diode 21a and a light receiving transistor 21b and operable to continue generating an ON signal to the light receiving transistor 21b when the driving current exceeding the reference current value that is set to, for example, 0.4 A flows across the input side light emitting diode 21a. The counter circuit 22 is operable to activate a time counter for generating, for example, a reference pulse during a period in which the light receiving transistor 21b receives the ON signal from the light emitting diode 2 la and for counting the number of pulses generated to thereby detect the time length. In this way, the time detecting unit 15 can have a simple and low cost structure and is yet capable of allowing a transport drive to be performed efficiently.

The driving frequency during the actual run can be set by applying a setting command to the frequency controlling unit 14 from a frequency setting unit 16 shown in FIG. 1. Specifically, the frequency setting unit 16 has a function of setting the driving frequency during the actual run based on the time lengths detected by the time detecting unit 15 with respect to change of the driving frequency during the trial run. By way of example, when the driving frequency is changed, the amplitude of the driving current are so large at a resonant frequency or a frequency about equal to the resonant frequency that the time length during which the driving current exceeds the reference current value exhibits a predetermined pattern of change and, accordingly, the driving frequency at which such predetermined pattern of change is exhibited is used during the actual run. Setting of this driving frequency may be done during the actual run. In other words, the driving frequency at which the time length detected by continuously varying the driving frequency at a suitable timing during the actual run and then detecting the time length that exceeded the reference current value has exhibited the predetermined pattern of change is set as a new driving frequency.

Figure 2:
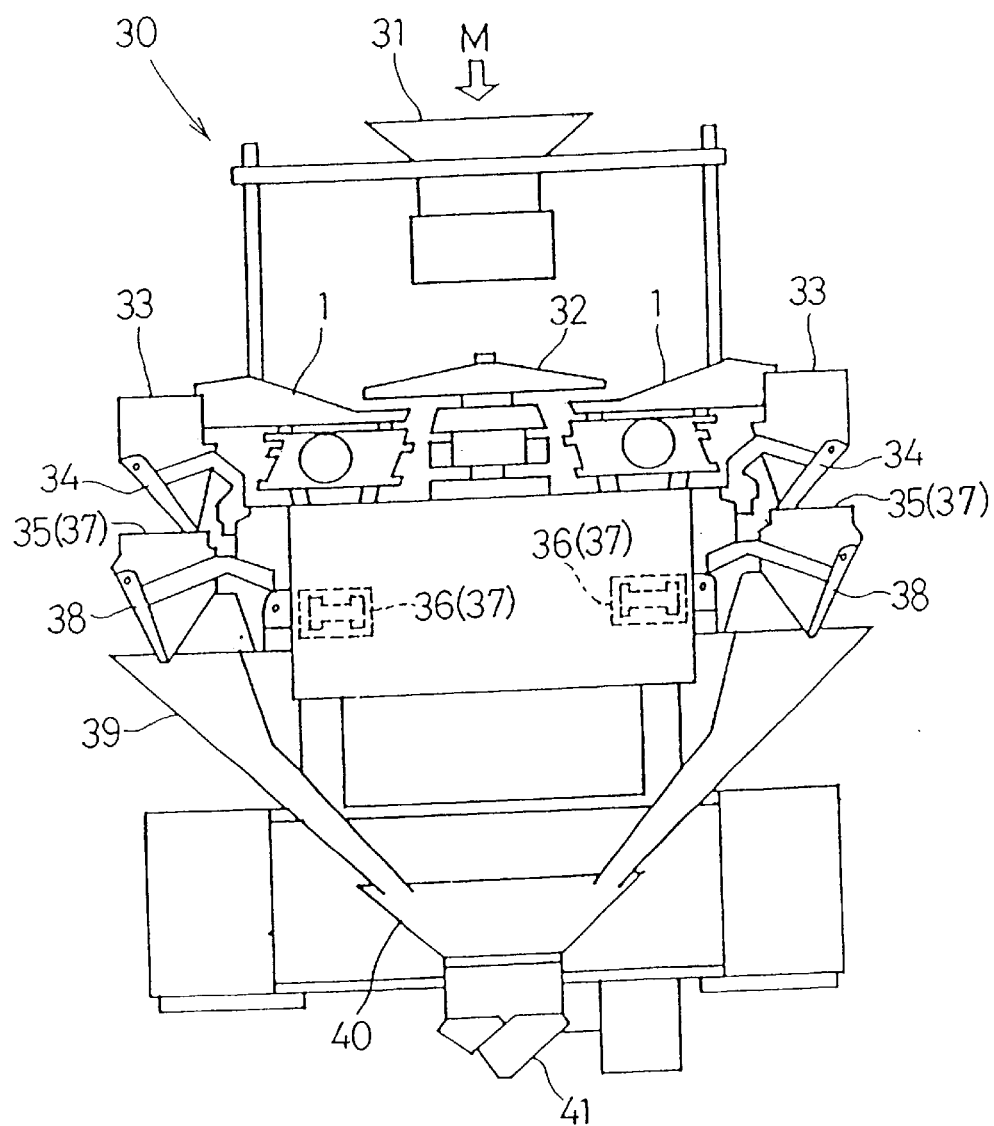
FIG. 2 is a schematic side view showing a combination weighing apparatus equipped with the electromagnetically driven transport devices shown in FIG. 1.

FIG. 2 illustrates a schematic side view of a combination weighing apparatus 30 equipped with a number of electromagnetically driven vibrating feeder 1 each being of the structure discussed above as a transport devices 1. The articles M are successively supplied centrally onto a relatively low conical dispensing feeder 32 through a supply chute 31 positioned immediately thereabove. As the dispensing feeder 32 is vibrated, the articles M falling onto the dispensing feeder 32 are radially outwardly dispensed into a plurality of the vibrating feeders (transport devices) 1 that are arranged radially outwardly with respect to and adjacent the conical dispensing feeder 32. The articles M so transferred to the vibrating feeders 1 are, after having been transported by the respective vibrating feeders 1, supplied into a corresponding number of pool hoppers 33 positioned radially outwardly of and adjacent the circular row of the vibrating feeders 1 and, after they have been temporarily pooled within the pool hoppers 33 in timed relation with a weighing operation, respective discharge gates 34 of the pool hoppers 33 are opened to allow the articles M to be supplied onto associated weighing hoppers 35 positioned immediately therebelow. Each of the weighing hoppers 35 in cooperation with an associated weight detector 36 such as, for example, a load cell coupled therewith forms a weighing unit 37, and the weight detector 36 detects the weight of the articles M, accommodated within the associated weighing hopper 35, and then to output a weight signal indicative of the detected weight of the article M. The articles M which have been weighed are subsequently collected in a collecting chute 39 upon opening of discharge gates 38 of the respective weighing hoppers 35 and are then discharged from a discharge chute 40 by way of a timing gate 41 at a lower end of the discharge chute 40. The articles M so discharged are packaged by a bagging machine (not shown) to provide bagged products each containing a target weight of the articles M.

The operation of the electromagnetically driven transport device (the vibrating feeder) 1 according to the first embodiment during the trial run will be described with reference to the waveforms shown in FIGS. 4 and 5 and the flowchart shown in FIG. 6. In the illustrated embodiment, the driving frequency of the driving power source for the vibrating unit 2 is automatically set to an actual driving frequency close to the natural frequency of the transport device 1.

Figure 6:
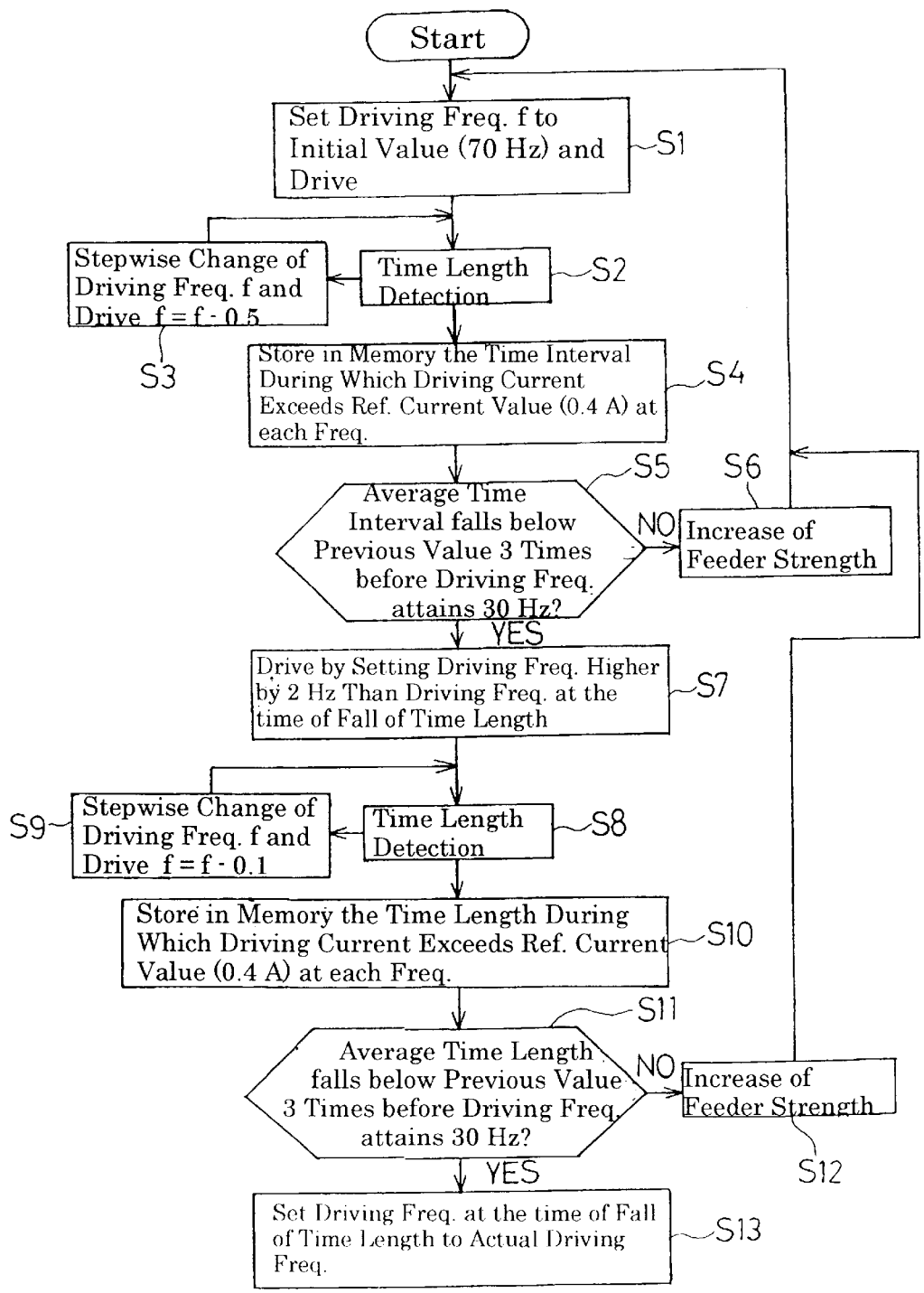
FIG. 6 is a flowchart showing the sequence of setting of a driving frequency of the electromagnetically driven transport device.

At the outset, the driving frequency f of the inverter 13 which serves as the driving power source for the vibrating unit 2 is set to an initial value, for example, 70 Hz by the frequency controlling unit 14, and the vibrating unit 2 is driven for a predetermined length of time, for example, about 2 seconds with a feeder strength kept constant (Step S1 in FIG. 6). During the vibrating unit 2 being driven in this way, and after a transient response of, for example, 1.5 sec., the time detecting unit 15 detects the length of time during which a driving current flowing through the electromagnet 8 of the vibrating unit 2 for each frequency (or pulse) of vibratory motion in directions opposite to each other exceeds the reference current value of 0.4 A (Step S2).

Thereafter, the transport device 1 is halted for a predetermined length of time, for example, about 8 sec. and a wait is then made until vibration is completely attenuated to fade out. It is to be noted that if the average value of the time length is about 0 μsec., the transport device 1 does barely undergo vibration and need not therefore be halted for a large length of time. In such case, the transport device 1 is halted for 2 seconds.

Figure 4:
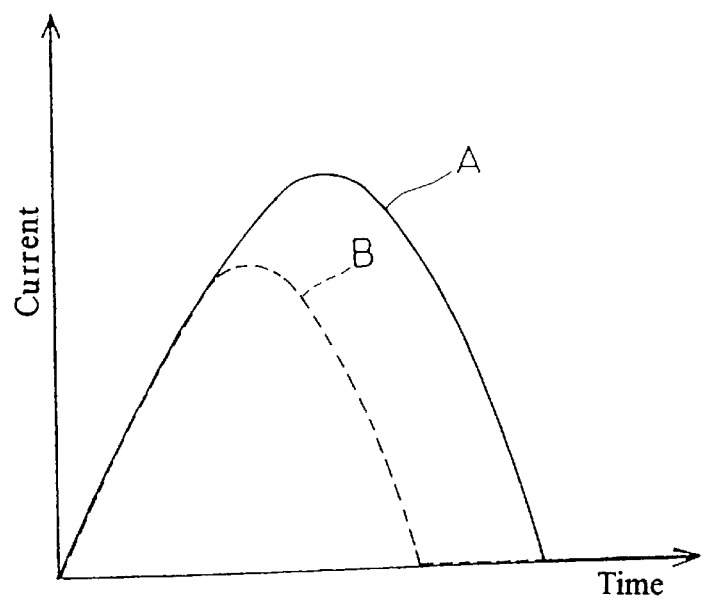
FIG. 4 illustrates a waveform of a driving current used to drive the electromagnetically driven transport device.
Figure 5:
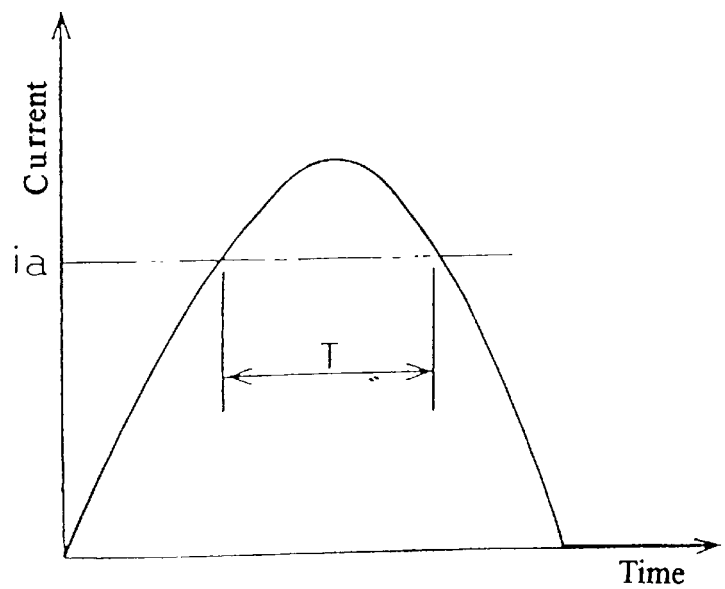
FIG. 5 is a chart used to describe the operation of a time detecting unit used in the electromagnetically driven transport device.

The driving current applied during a single pass of vibratory motion of the transport device 1 represents such waveforms as shown by A and B in FIG. 4. A peak point of each of the waveforms A and B coincides with the point of maximum amplitude. In this example, the voltage applied to the vibrating unit 2 is fixed at a predetermined value and, under this condition, the greater the amplitude of vibration of the vibrating unit 2, the higher the driving current value. In other words, the closer the driving frequency f to the natural frequency of vibration, the higher the driving current value and, therefore, the length of time during which the driving current exceeds the reference current value is large correspondingly.

By way of example, in FIG. 4, the driving frequency f is closer to the natural frequency of vibration of the transport device 1 when the driving current represents the waveform A than when the driving current represents the waveform B. In view of this, the time length detection performed by the time detecting unit 15 at the step S2 is such as to detect the time length T during which as a result of the driving current i exceeding the predetermined reference current value, for example, ia=0.4 A the light emitting diode 21a of the photo coupler 21 issues the ON signal to the light receiving transistor 2 lb. It can thus be regarded that the larger the time length T, the higher the driving current i. The detection of the time length T may be carried out by the counter circuit 22. Specifically, a time counter included in the counter circuit 22 for generating reference pulses may be activated during the period in which the light receiving transistor 21b receives the ON signal from the light emitting diode 21a so that the number of pulses generated can be counted.

Then, the driving frequency is reduced from 70 Hz by, for example, 0.5 Hz and, hence, down to 69.5 Hz and the steps S1 and S2 are repeated to drive the vibrating unit 2 for detecting the time length T. The time length T is determined to be an average value of time lengths detected for a plurality of cycles of the current. Even thereafter, the driving frequency is reduced by 0.5 Hz and the step S1 and S2 are again repeated to drive the vibrating unit 2 for detecting the time length T. In this way, a cycle of the steps S1 and S2 is repeated a predetermined number of times at step S3 with the driving frequency is progressively reduced by an decrement of 0.5 Hz. At each of driving frequencies the time lengths T so detected, during which the driving current has exceeded the reference current value ia (=0.4 A) are stored in a memory (not shown).

The frequency setting unit 16 then determines at step S5 whether the average value of the time lengths T detected in the manner described above decreases below the previous value three times consecutively before the driving frequency attains 30 Hz. If it is determined that the average value has fallen the previous value three times consecutively, it is deemed that the resonance frequency (that is, the actual driving frequency) may be found at a value about equal to the driving frequency for which the average value has started decreasing below the previous value and the program flow then goes to step S7. On the other hand, if the driving frequency attains 30 Hz before the average value falls the previous value three times consecutively, the feeder strength is increased a little at step S6, with the program flow subsequently returning to step S1.

At step S7, the driving frequency f is set to a value higher by 2 Hz than the driving frequency for which the average value has started decreasing and the vibrating unit 2 is then driven at that driving frequency f in a manner similar to that during step S1. Then at step S8, the time length T is detected in a manner similar to that at step S2. Again, the driving frequency is reduced down to a value lower by, for example, 0.1 Hz than that at step S7, and the vibrating unit 2 is driven in a manner similar to that at steps S7 and S8 so that the time length T can be detected. The foregoing procedures are repeated at step S3.

The time lengths T during which the driving current exceeds the reference current value ia (=0.4 A) at each of those driving frequency are stored in a memory at step S10.

The frequency setting unit 16 again determines at step S11 whether the average value of the time lengths T decreases below the previous value three times consecutively before the driving frequency attains 30 Hz. If it is determined that the average value has fallen the previous value three times consecutively, a frequency immediately before which the average value has started decreasing is utilized as the resonance frequency (that is, the actual driving frequency) at step S13. On the other hand, if the driving frequency attains 30 Hz before the average value falls the previous value three times consecutively, the feeder strength is increased a little at step S12, with the program flow subsequently returning to step S1. In this way, the frequency setting unit 16 sets the actual driving frequency based on change of the time length T and, therefore, even though the time length represents various values, it is possible to set the actual driving frequency appropriate to the change of the time lengths.

It is to be noted that in the foregoing description determination has been made of whether the average value of the time lengths T has decreased below the previous value three times consecutively, the number of times during which the average value decreases may not be limited to three such as described, but may be one or two. It is also to be noted that in place of the average value of the time values T or in combination with the average value of the time lengths T, the foregoing determination may be made based on individual deviations of the time lengths T.

The frequency setting unit 16 applies to the frequency controlling unit 14 a command instructing that the driving frequency determined at that time should be employed as an actual driving frequency during the actual run of the apparatus. Accordingly, during the actual run, the actual driving frequency of the inverter 13 is rendered to be the driving frequency equal to or about equal to the natural frequency of the transport device 1. The driving frequency of the driving power source of the vibrating unit 2 is thus automatically set to the actual driving frequency about equal to the natural frequency of the transport device 1. As discussed above, in the present invention, neither a detecting circuit for detecting an electric current or an electric voltage, a calculating unit nor a large capacity storage unit is needed and, accordingly, a highly efficient transport drive can be achieved with a simplified and low const system structure.

In the combination weighing apparatus 30 shown in FIG. 2, the transport device, that is, the electromagnetically driven vibrating feeder 1, is employed in a plural number, generally one for each of the pool hoppers 33. Accordingly, for each transport device or vibrating feeder 1, the driving frequency f at which the respective transport device is driven during the actual run is set by the frequency setting unit 16 in the manner described above with reference to the flowchart. Since the natural frequency generally varies from one transport device to another and, therefore, the driving frequency f is uniquely set to each transport device so that all of the vibrating feeders 1 can perform an efficient task of transporting the articles M onto the associated pool hoppers 33.

Figure 7:
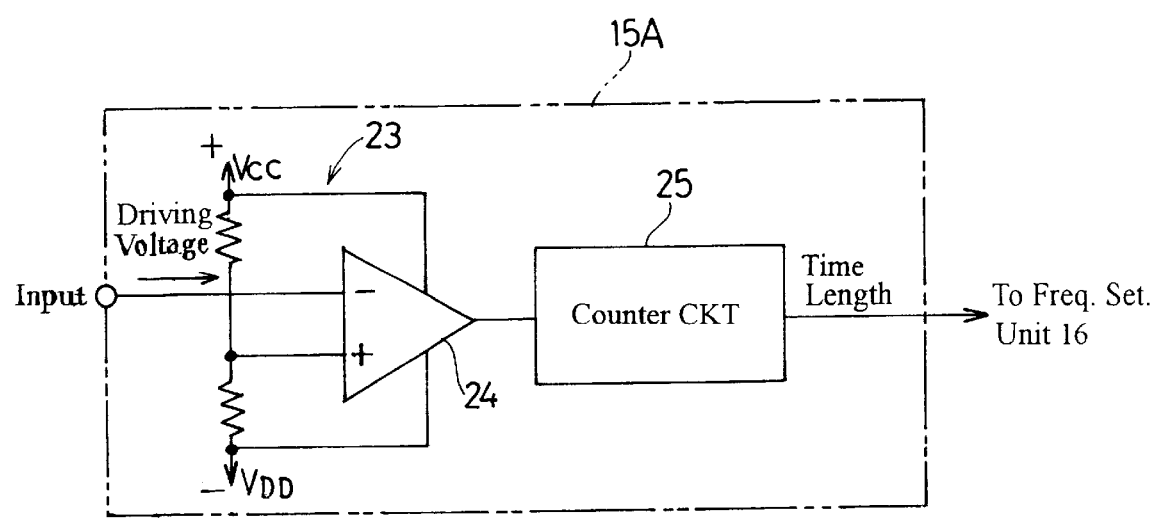
FIG. 7 is a circuit diagram showing an alternative form of the time detecting unit employed in the electromagnetically driven transport device.

It is to be noted that although in the foregoing embodiment, the time detecting unit 15 has been shown and described as including the element 21 such as the photo coupler that is activated when the driving current exceeds the reference current value, so as to enable the time length T to be detected in dependence on the operation of this element 21, a time detecting unit 15A may be employed of a structure including, as shown in FIG. 7, a voltage comparator 23 for comparing a voltage corresponding to the previously described driving current with a voltage corresponding to the previously described reference current value to enable the time length T to be detected in dependence on an output condition of the voltage comparator 23.

Referring now to FIG. 7, the voltage comparator 23 includes an operational amplifier (OP-amp) 24 operable to compare a driving voltage, corresponding to the driving current of the vibrating unit 2 that has been converted into a voltage, with a reference voltage ($V_{CC}$, $V_{DD}$) of, for example, ±15 V to provide the ON or OFF signal. The counter circuit 25 is operable to activate a time counter for generating, for example, a reference pulse during a period in which the operational amplifier 24 generates the ON signal, to count the number of pulses generated to thereby detect the time length. In this way, the time detecting unit 15A can have a simple and low cost structure and is yet capable of allowing a transport drive to be performed efficiently.

Figure 8:
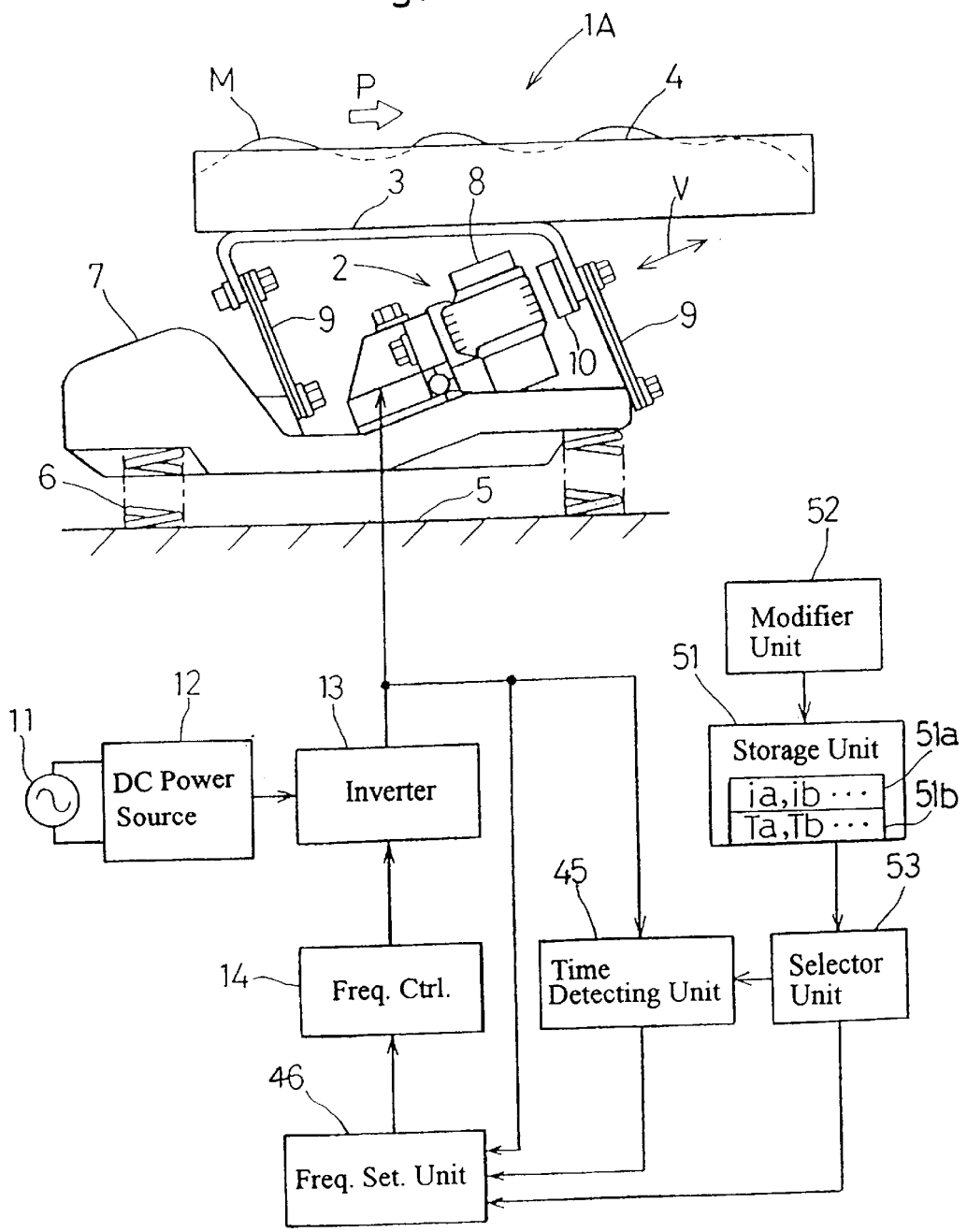
FIG. 8 is a side view showing the electromagnetically driven transport device according to a second preferred embodiment of the present invention shown together with a circuit block diagram therefore.
Figure 9:
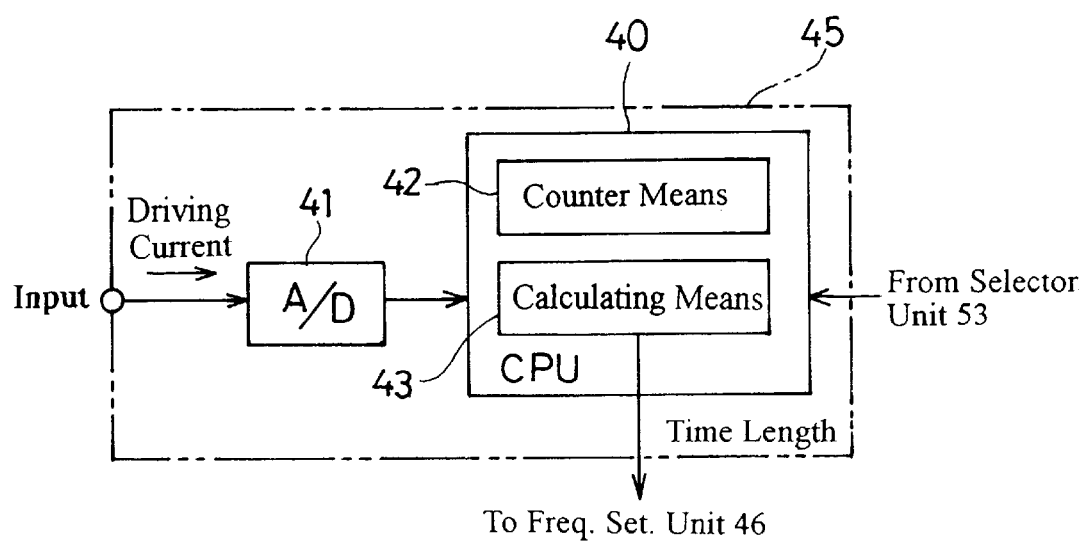
FIG. 9 is a circuit block diagram showing the time detecting unit used in the electromagnetically driven transport device shown in FIG. 8.
Figure 10:
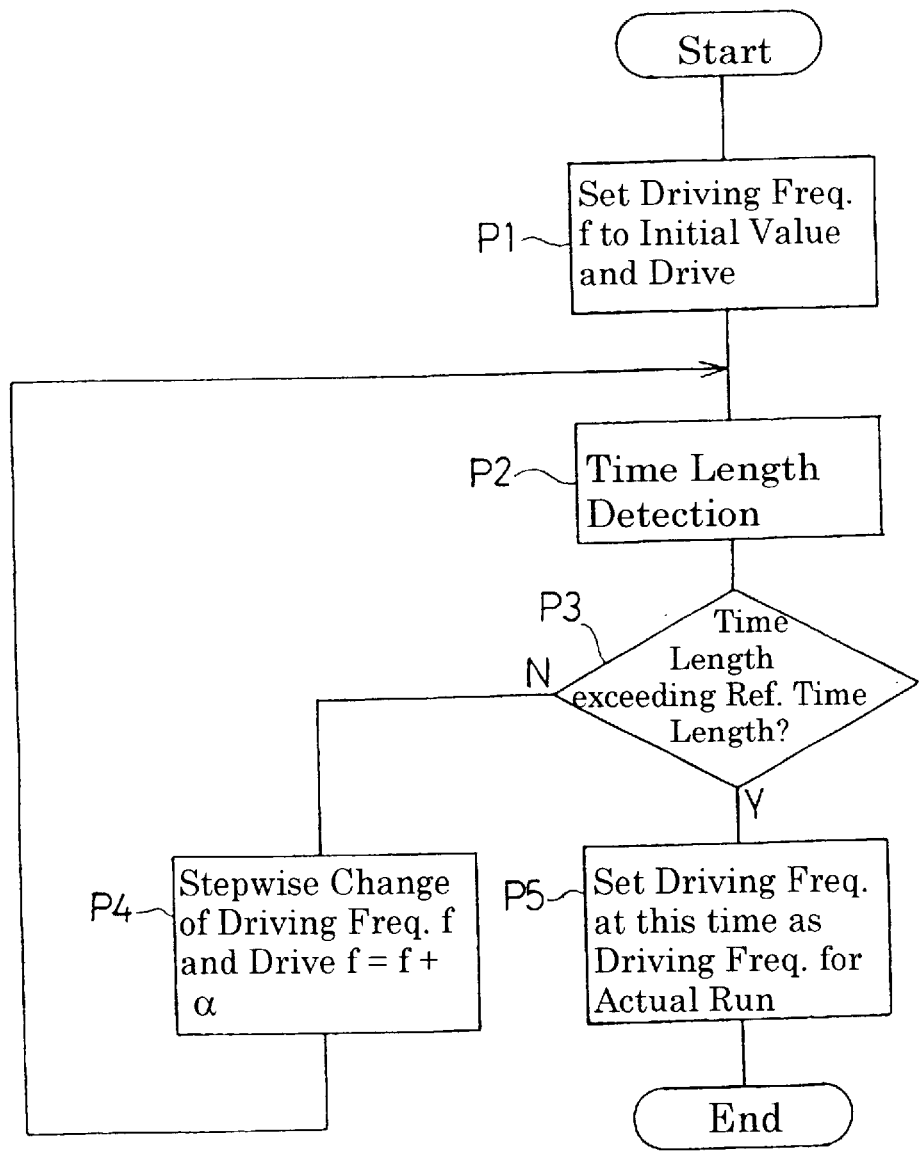
FIG. 10 is a flowchart showing the sequence of setting of the driving frequency of the electromagnetically driven transport device.

With reference to FIGS. 8 to 10, a second preferred embodiment of the present invention will be described. This second embodiment differs from the previously described first embodiment in that the system shown in FIG. 8 includes a storage unit 51, a modifier unit 52 and a selector unit 53.

The storage unit 51 is a means for storing a reference current value of the driving current of the vibrating unit 2 and a reference time length during which the driving current of the vibrating unit 2 exceeds the reference current value. This storage unit 51 includes a first memory 51a for storing a plurality of different reference current values ia, ib, . . . and a second memory 51b for storing a plurality of different reference time lengths Ta, Tb, . . . . It is to be noted that the first memory 51a and the second memory 51b may be provided in different storage units separately. The modifier unit 52 is utilized to allow an operator to change the reference current values ia, ib, . . . and/or the reference time lengths Ta, Tb, . . . . One of the reference current values ia, ib, . . . and one of the reference time lengths Ta, Tb, . . . that is selectively read out from the storage unit 51 by the selector unit 53 can be inputted to the time detecting unit 45 and the frequency setting unit 46.

The frequency setting unit 46 has a function of setting as a driving frequency to be used during the actual run, the frequency at which the time length detected by the time detecting unit 45 with respect to change in driving frequency during the trial run has exceeded a predetermined reference time length. Since the amplitude of the driving current increase at the resonant frequency or the frequency close to the resonant frequency enough for the time length, during which the driving current exceeds the reference current value, to exceed the reference time length, the driving frequency prevailing at that time is utilized during the actual run. As is the case with the previously described first embodiment setting of this driving frequency may be carried out during the actual run.

As shown in FIG. 9, the time detecting unit 45 includes an analog-to-digital (A/D) converter 41 for converting an analog signal of the driving current of the vibrating unit 2 into a digital signal of the driving current, and a central processing unit (CPU) 40. The central processing unit 40 includes a counting means 42 for activating a time counter for generating a reference pulse, during a period in which the digital driving current exceeds the reference current value (the threshold value) and for counting the generated pulses, and a calculating means 43 for calculating the time length in dependence on the counted number of the pulses. Other structural features than those described above are substantially similar to those shown and described in connection with the first embodiment.

The operation of the electromagnetically driven transport device 1A according to the second embodiment during the trial run will be described with reference to the flowchart shown in FIG. 10. At the outset, the driving frequency f of the inverter 13, which is a driving power source of the vibrating unit 2 shown in FIG. 8 is set to an initial value by the frequency controlling unit 14 and the vibrating unit 2 is driven at this initial driving frequency at step P1 shown in FIG. 10. While the vibrating unit 2 is so driven, the time detecting unit 45 detects at step P2 the time length T during which the driving current flowing through the electromagnet 8 of the vibrating unit 2 exceeds the reference current value.

The detecting operation of the time detecting unit 45 at step P2 is to detect the time length T during which the driving current i exceeds the predetermined current value ia selected and read out by the selector unit 53 from the storage unit 51. Detection of this time length T is carried out by the counting means 45 by activating the time counter for generating the reference pulses to count the number of pulses generated during a period in which the digital driving current exceeds the reference current value, and then causing the calculating means 43 to calculate the time length T in dependence on the counted number of the pulses.

The time length T detected by the time detecting unit 45 is compared with the predetermined reference time length Ta by the frequency setting unit 46. If at this time the detected time length T does not exceed the reference time length Ta as determined at step P3, the frequency controlling unit 14 changes stepwise the driving frequency f of the inverter 13 by a predetermined value α, for example, 0.1 Hz and the vibrating unit 2 is further driven at step P4. In a similar manner, until the detected time length T exceeds the reference time length Ta, the flow of steps P2 to P4 for stepwise changing the driving frequency f by the predetermined value α is repeated.

On the other hand, if the detected time length T exceeds the reference time length Ta as determined at step P3, the frequency setting unit 46 applies to the frequency controlling unit 14 a command instructing that the driving frequency determined at that time should be employed as an actual driving frequency during the actual run of the apparatus. Accordingly, during the actual run, the actual driving frequency of the inverter 13 is rendered to be the driving frequency, which has been set in the manner described above, that is, the frequency equal to or about equal to the natural frequency of the transport device 1A. Therefore, even in the second embodiment of the present invention, neither a detecting circuit for detecting an electric current or an electric voltage, a calculating unit nor a large capacity storage unit is needed and, accordingly, a highly efficient transport drive can be achieved with a simplified and low const system structure.

In the event that in the transport device 1A the kind of the particles M to be transported thereby changes and/or the trough 4 is replaced with a different type of trough, the natural frequency of the transport device 1A changes correspondingly. In order that the transport device 1A of the present invention can accommodate those changes, the storage unit 51 stores therein a plurality of reference current values ia, ib, and a plurality of reference time lengths Ta, Tb, for each of kinds of the articles M and/or each of types of the troughs and, based on an externally generated command, for example, the command issued by the operator, the selector unit 53 reads out appropriate ones of the reference current values and the reference time length out of the stored reference current values and the stored reference time lengths, respectively, which are then inputted to the time detecting unit 45 and the frequency setting unit 46, respectively. In this way, even though the kind of the articles M changes and/or the type of the trough changes, an efficient transport can be performed. This is accommodated for each of the vibrating feeders 1A employed in the previously described combination weighing apparatus 30.

It is to be noted that the reference current values and the reference time lengths stored in the storage unit 51 can be varied by the modifier unit 52 and, accordingly, even when the kind of the articles M to be transported is changed to a different kind not initially expected, the system can easily accommodate such change to perform an efficient transport activity. Thus, the system of the present invention has a versatility in application.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An electromagnetically driven transport device, comprising:
    a transport unit of transporting an article;
    an electromagnetically driven vibrating unit for vibrating the transport unit to transport the article, the vibrating unit comprising a driving power source;
    a control unit for controlling the driving power source at a plurality of driving frequencies;
    a time detecting unit for detecting a time length during which a driving current of the vibrating unit of each of the driving frequencies exceeds a reference current value; and
    a frequency setting unit for setting an actual driving frequency based on the time length detected by the time detecting unit.

2. The electromagnetically driven transport device as claimed in claim 1, wherein the time detecting unit includes an element that is activated when the driving current exceeds the reference current value, and detects the time length depending on an operating condition of the element.

3. The electromagnetically driven transport device as claimed in claim 1, wherein the time detecting unit includes a voltage comparator for comparing a voltage corresponding to the driving current with a voltage corresponding to the reference current value for outputting an output signal, and is operable to detect the time length in dependence on a condition of the output signal from the voltage comparator.

4. The electromagnetically driven transport device as claimed in claim 1, wherein the frequency setting unit sets the actual driving frequency based on a change of the time length.

5. The electromagnetically driven transport device as claimed in claim 1, further comprising a first memory for storing a reference current value and a detecting means for detecting a current value of the driving current, and the time detecting unit is operable to detect the time length based on the detected current value and the reference current value.

6. The electromagnetically driven transport device as claimed in claim 5, further comprising a second memory for storing a reference time length during which the driving current of the vibrating unit exceeds the reference current value and wherein the frequency setting unit is operable to set, as the actual driving frequency, the driving frequency for which the time length for each of frequencies detected exceeds the reference time length.

7. The electromagnetically driven transport device as claimed in claim 1, wherein a detection performed by the time detecting unit is carried out during a trial run of the transport device and a drive of the transport device at the actual driving frequency is carried out during an actual run of the transport device.

8. A weighing apparatus which comprises:
a plurality of electromagnetically driven transport devices each being of the structure as defined in claim 1; and
a weighing unit for weighing an article transported by each of the electromagnetically driven transport devices;
wherein an actual driving frequency for each of the electromagnetically driven transport devices is individually set by the frequency setting unit.

9. A weighing apparatus comprising:
an electromagnetically driven transport device having a structure as defined in claim 1; and
weighing means for weighing an article transported by the electromagnetically driven transport device;
wherein an actual driving frequency of the electromagnetically driven transport device is set by the frequency setting unit.

10. An electromagnetically driven transport device comprising:
transport means for transporting an article to be transported;
electromagnetically driven vibrating means for vibrating the transport means to transport the article;
control means for controlling the vibrating means at a plurality of driving frequencies;
time detecting means for detecting a time length during which a driving current of the vibrating means of each of the driving frequencies exceeds a reference current value; and
frequency setting means for setting an actual driving frequency based on the time length detected by the time detecting means.

11. An electromagnetically driven transport device comprising:
an electromagnetically driven vibrating unit for vibrating an article;
a control unit for controlling the vibrating unit at a plurality of driving frequencies;
a time detecting unit for detecting a time length during which a driving current of the vibrating unit of each of the driving frequencies exceeds a reference current value; and
a frequency setting unit for setting an actual driving frequency based on the time length detected by the time detecting unit.

* * * * *

UNITED STATES PATENT AND TRADEMARK OFFICE
CERTIFICATE OF CORRECTION

PATENT NO. : 6,763,934 B2
DATED : July 20, 2004
INVENTOR(S) : Yoshihiro Nakamura et al.

It is certified that error appears in the above-identified patent and that said Letters Patent is hereby corrected as shown below:

Title page,
Item [30], Foreign Application Priority Data, change "Aug. 31, 2000" to
-- Aug. 31, 2001 --.
Item [56], References Cited, U.S. PATENT DOCUMENTS, please delete the following references:
"5,291,398   3/1994   Hagan
5,532,928   7/1996   Stanczyk et al.
5,631,828   5/1997   Hagan
5,664,112   9/1997   Sturgeon et al.
5,726,884   3/1998   Sturgeon et al.
5,765,140   6/1998   Knudson et al.
5,793,636   8/1998   Cooney et al.
5,808,916   9/1998   Orr et al.
5,864,685   1/1999   Hagan
5,890,129   3/1999   Spurgeon
6,067,549   5/2000   Smalley et al.
6,085,976   7/2000   Sehr
6,088,700   7/2000   Larsen et al.
6,091,835   7/2000   Smithies et al.
6,122,635   9/2000   Burakoff et al.
6,256,640   7/2001   Smalley et al.
6,260,044   7/2001   Nagral et al.".
OTHER PUBLICATIONS,
Please delete all references under this section.

Signed and Sealed this

Twentieth Day of September, 2005

JON W. DUDAS
*Director of the United States Patent and Trademark Office*